United States Patent [19]

Patell et al.

[11] Patent Number: 4,640,312
[45] Date of Patent: Feb. 3, 1987

[54] PREFABRICATED THERMALLY INSULATED PIPELINE SECTION

[75] Inventors: Farrokh A. Patell, Cheltenham; Stephen E. McConkey, Islington, both of Canada

[73] Assignee: Shaw Industries Ltd., Rexdale, Canada

[21] Appl. No.: 681,277

[22] Filed: Dec. 13, 1984

[30] Foreign Application Priority Data

Dec. 22, 1983 [CA] Canada ............................... 444038

[51] Int. Cl.[4] .............................................. F16L 9/22
[52] U.S. Cl. .................................. 138/109; 138/149
[58] Field of Search ....................... 138/109, 140, 149

[56] References Cited

U.S. PATENT DOCUMENTS

| | | | |
|---|---|---|---|
| 1,525,087 | 2/1925 | Murray | 138/108 X |
| 2,664,112 | 12/1953 | Isenberg | 138/149 |
| 2,707,493 | 5/1955 | Bonvillian et al. | 138/149 |
| 3,933,182 | 1/1976 | Costes | 138/149 |
| 4,014,369 | 3/1977 | Kobres, Jr. | 138/112 |

OTHER PUBLICATIONS

"Shaw Develops a New Thermal Coating for Pipe", *Canadian Petroleum*, Oct. 1981, Alister Thomas.

*Primary Examiner*—Stephen Marcus
*Assistant Examiner*—Mark Thronson
*Attorney, Agent, or Firm*—Ridout & Maybee

[57] ABSTRACT

Prefabricated insulated pipeline section having a one-piece cast cured and dried insulative liner formed of lightweight aggregate in a foamed portland cement paste binder bonded to the inner surface of a tubular outer casing. The liner composition may be cast, in place between the liner and the pipe, and wet cured at elevated temperature. Bonding between the pipe and the liner composition is avoided by employing a cement cure retarder on the outer surface of the pipe or by mechanically debonding the pipe from the liner during curing. After curing, the pipe is withdrawn to expose the inner surface of the liner to permit rapid drying at elevated temperature. The prefabricated insulated sections permit simplified pipeline construction at reduced cost as compared with traditional methods of applying half shells of insulation to the pipeline on site.

21 Claims, 6 Drawing Figures

PREFABRICATED THERMALLY INSULATED PIPELINE SECTION

The present invention relates to prefabricated pipeline sections especially, although not exclusively, suitable for use in conveying high temperature fluids, e.g. steam at temperatures in excess of about 400° F.

Conventionally, in the construction of thermally insulated pipelines intended for high temperature service, relatively short lengths of semi-cylindrical calcium silicate insulation material are applied to the pipeline on site after the individual lengths of pipe have been welded together. The short lengths of insulation material, known as "half shells" are attached to the pipe by strapping and a protective or weather-resistant covering is applied. This construction procedure is, however, time-consuming and expensive.

Considerable economies could be effected by the in-plant manufacture of prefabricated insulated pipeline sections which could then be transported to the location of the pipeline installation for joining together to form the completed pipeline. The conventional calcium silicate material, however presents the problem that its curing reaction is attended by considerable shrinkage of the material, and the prefabrication of calcium silicate sections beyond a certain size becomes impracticable, as the increased length of the sections exacerbates the shrinkage problem and tends to result in the final product being defective due to the presence of numerous voids and cracks. Pre-assembly of individual half shell sections onto the pipe in the factory would be possible, but the half shell sections would be prone to loosening or shifting during transport, and the costs would not be significantly reduced as compared with the costs of the traditional on-site assembly method.

We have now developed a prefabricated thermally insulated pipeline section employing an insulating composition based on portland cement. One advantage of this is that it is more cost effective than the calcium silicate material, and, further, the curing of portland cement is not attended by the shrinkage problems that result with calcium silicate. We have found that it is necessary to dry the cured cement-based insulation material prior to use. Usually, substantially all free moisture remaining after completion of the hydration reaction has to be eliminated from the cured cement material. The presence of any substantial amount of free moisture in the insulation material gives rise to such problems as the thermal conductivity of the insulation material being excessively high, as the water is a relatively good heat conductor. Further, it is normally desired to encase the insulation material with a moisture-impermeable casing. At high service temperatures, the steam pressure generated from vaporization of residual moisture trapped within the casing may result in bursting of the exterior casing.

The present invention provides a product which is well adapted to be prefabricated by in-plant manufacturing techniques and which includes a cast, cured and dried one-piece insulative covering for the pipe, offering economic and other advantages over the conventional technique of on-site assembly of insulation half shells, and provides a method for the manufacture of the same. In one aspect, the invention consists in a method of fabricating an insulated pipeline section comprising positioning within a tubular casing a mandrel in spaced relationship from the interior surfaces of the casing, injecting into the space therebetween a liner composition comprising lightweight expanded aggregate in a foamed aqueous portland cement binder paste, curing the liner composition to a desired degree of final cure without permitting the cured liner to bond to the mandrel and while maintaining at least a predetermined moisture content in the composition, withdrawing the mandrel from the liner and casing, whereby the inner surface of the liner is exposed, drying the cured liner by subjecting its exposed inner surface to a drying atmosphere, and introducing into the cured and dried liner a pipe having its exterior conforming to that of the mandrel, whereby the inner surface of the liner closely conforms to but is in disjunction from the exterior surface of the pipe.

In the preferred form, the mandrel employed in the step of moulding the liner composition within the casing is the length of pipe that is to be employed in the fabrication of the pipeline section. Thus, in the fabrication of the pipeline section, a length of pipe is introduced into the casing to define the mould cavity, is withdrawn prior to the drying operation, and the same length of pipe is subsequently re-introduced into the cavity defined by the inner surface of the dried liner. Preferably, the liner is permitted to cure to a desired degree of final cure before the mandrel or pipe is withdrawn from the liner and the inner surface of the liner is exposed.

Bonding of the mandrel or pipe to the liner composition may be avoided by coating its outer surface with a cement cure retarding agent so that the main portion of the liner composition may cure to the desired final stage, and the pipe or mandrel may be withdrawn, before the portions adjacent to and affected by the retarding composition set up sufficiently to bond to the mandrel or pipe. Alternatively, the composition may be permitted to partially cure and then the mandrel or pipe may be debonded by displacing it relative to the liner composition following which the liner composition is allowed to cure to its desired final stage.

The mandrel or pipe may be debonded by displacing it relative to the liner composition at a stage at which the liner composition has set up sufficiently to prevent it from rebonding firmly to the exterior surface of the mandrel or pipe, but before the bond strength is sufficient to present risk that displacement of the mandrel or pipe will result in disruption of the somewhat soft liner structure.

The method of the invention has numerous advantages. The exposure of the interior surface of the liner greatly facilitates rapid drying of the cured liner and permits the drying operation to be conducted at elevated temperatures, for example well above the boiling point of water, thus permitting the cured liner to be dried to a substantially completely dry condition in relatively short times. The outer casing, to which the liner composition remains bonded, may serve the dual function of forming an outer mould for the liner composition and of providing a weather-resistant and protective covering for the insulation material. In construction of the pipeline, the ends of successive pipe lengths will be welded together to form an integral line, and it will normally be desirable to secure the outer casing to supporting structures or, in the case of underground installations, to have the pipeline casing remain stationary relative to the surrounding earth. In the product obtained with the present method, the pipe remains unbonded to the liner and so longitudinal thermal expansions and contractions of the pipeline can be accommodated by the pipe sliding freely longitudinally within the liner.

In accordance with a further aspect, the invention consists in a prefabricated thermally insulated pipeline section comprising an outer tubular casing, a pipe disposed within and in spaced relationship to the inner surfaces of the casing, and disposed between the casing and the pipe a one-piece cast thermally insulative liner comprising particles of lightweight expanded aggregate in a foamed, cured, and dried portland cement binder, the liner bonding to the inner surfaces of the casing and having an inner annular surface closely conforming to but in disjunction from the exterior surface of the pipe.

An insulated pipeline section in accordance with the invention and its method of fabrication will now be described in more detail, by way of example only, with reference to the accompanying drawings, in which.

Figure 1:
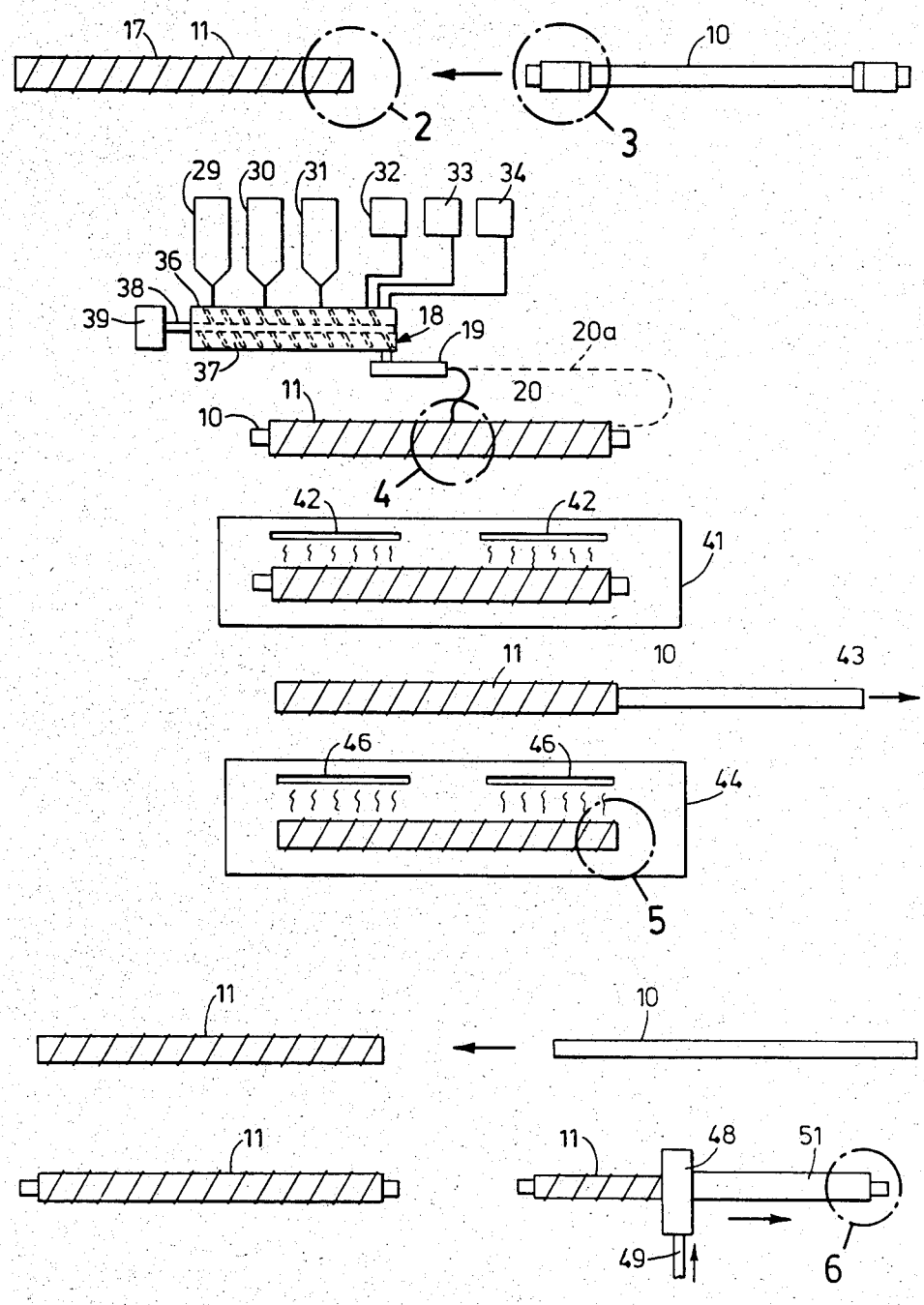
FIG. 1 is in the nature of a flow sheet illustrating partially schematically successive stages of a fabrication method.
Figure 2:
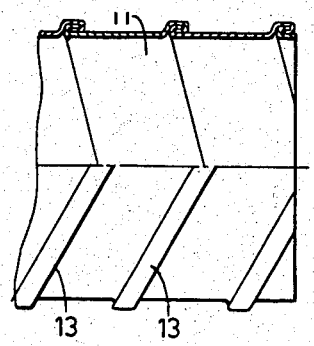
FIGS. 2 and 3 are partial side views, partly in section and on an enlarged scale, of end portions of the casing and pipe sections employed in the fabrication method and circled at 2 and 3, respectively, in FIG. 1.
Figure 3:
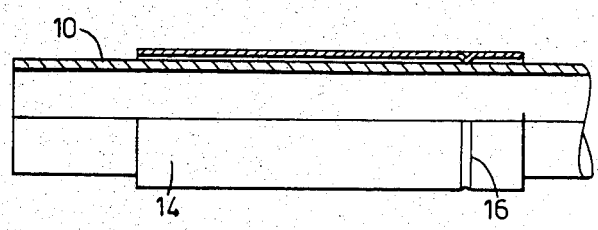

Referring to the drawings, in which like reference numerals indicate like parts, FIG. 1 shows a length of pipe 10, e.g. steel pipe, to be insulated, and a tubular outer casing 11 which will serve to retain the insulation material. Preferably the casing 11 is moisture-impermeable and corrosion-resistant. In the preferred form, as shown in FIG. 2, the casing 11 is formed from galvanized steel strip helically wound and united at its edges by interlocking edge seams 13. The casing 11 is somewhat shorter than the length of pipe 10, so that in the final product the pipe 10 protrudes beyond the casing 11 and the applied insulation material at each end to provide pipe end portions which will be available for welding to those of adjacent insulated pipeline sections. Over each end of the pipe 10 may be fitted a cylindrical sleeve 14, preferably of metal, e.g. steel, with each sleeve 14 being positioned so that its end will be approximately in register with the adjacent end of the casing 11. The sleeves 14 have an internal diameter slightly larger than the external diameter of the pipe 10. Each sleeve 14 is corrugated adjacent its inner end to form an inwardly directed rib 16 which lightly grips the exterior of the pipe 10 so that the sleeve 14 is easily rotated about or slid along the pipe 10. The rib 16 forms with the pipe 10 a flow restriction which will reduce or prevent flow of the insulation material slurry into the space between the sleeve 14 and the pipe 10.

The pipe 10 is inserted into the casing 11, and the pipe 10 and casing 11 are supported so that the pipe 10 is approximately concentric with the casing 11 by support means (not shown).

Figure 4:
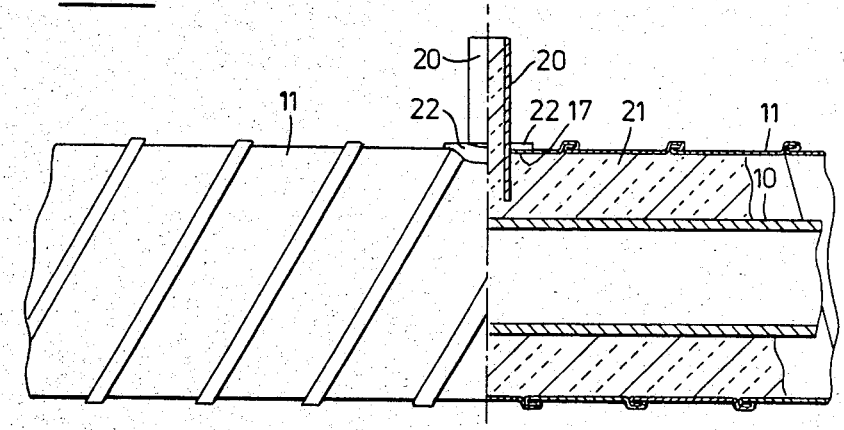
FIG. 4 is a view, partially in section, on an enlarged scale of the central area of the pipeline section during the stage of injection of the liner composition, as circled at 4 in FIG. 1.

The next stage in the fabrication method, as illustrated in FIG. 1, is the injection of a liner composition of a foamed aqueous slurry mixture of lightweight aggregate and portland cement into the spacing or mould cavity defined between the pipe 10 and the casing 11. In the case in which the pipeline section is to be provided with a sealing protective jacket such as a jacket of thermoplastic resin, for example for use in underground pipeline installations, the foamed slurry may be injected through an aperture 17 in the casing 11. The foamed slurry, prepared in a mixing and foaming apparatus 18, is pumped by a pump 19 through a hose 20. The foamed slurry of the liner composition 21 flows along the cavity and displaces air from the cavity. In the example shown in more detail in FIG. 4, the free end of the hose 20 extends into the annular cavity formed between the pipe 10 and the casing 11. The hose 20 may be provided with an annular sealing gasket 22 forming a seal with the outer surface of the casing 11 adjacent the aperture 17 to prevent or reduce loss of the slurry composition 21. The hose 20 and gasket 22 may be retained on the casing 11 by a strap or the like (not shown) so that the pressure of the composition 21 does not displace the hose 20 outwardly. In cases in which the application of a sealing protective thermoplastic or other jacket over the casing 11 would be undesirable or inappropriate, as for example would normally be the case in pipeline sections intended to be employed in above-ground installations, it will normally be desired to employ an imperforate outer casing 11 and, in such cases, the foamed slurry mixture may be injected into one end of the casing 11 through a hose positioned as indicated by the broken line 20a in FIG. 1.

The foamed slurry composition 21 consists of cement, expanded lightweight aggregate, and water, with or without such additives as small quantities of fibres, air-entraining agents, and cement cure accelerating agents. Preferred compositions are described in more detail later herein.

In the preparation of the slurry mix and forming it into a foam, as illustrated in FIG. 1, the ingredients such as cement powder from hopper 29, lightweight expanded aggregate from hopper 30, water from holding tank 31, fibres from hopper 32, liquid surfactant or other air-entraining agent from holding tank 33 and liquid cure accelerating agent from holding tank 34 are metered into the mixing and foaming device 18 which may be in the form of an open topped trough 36 equipped with helical stirring blades or paddles 37 supported on and rotated by a shaft 38 driven by motor 39. In the mixing and foaming device, the ingredients are well mixed to form a slurry which, with continued mixing and agitation, becomes whipped up into an air-entraining foam. It is desired to employ a foam containing a high proportion of entrained air bubbles in order to achieve a light weight set and cured product containing numerous interstices thus imparting low density and high thermal insulation values to the product. The wet density of the foamed slurry will desirably be in the range about 30 to about 60 lbs. per cu. ft., more preferably about 35 to about 45 lbs. per cu. ft. Typically, the foamed mix will have the consistency of shaving foam.

Before commencing the injection operation, plugs or end inserts of insulation material may be introduced into one or both ends of the mould cavity defined between the pipe 10 and the casing 11. The end inserts may consist of precast and cured, but not necessarily dried, cylindrical or semi-cylindrical shells of the same foamed composition as that used for the liner composition. Where used, the end inserts will be formed with internal and external diameters conforming to the external diameter of the pipe 10, or of the sleeves 14 where employed, and the internal diameter of the casing 11, respectively, and may be positioned with their end faces flush with the edge of the casing 11. In the case in which the injection is made through an aperture in the casing 11, as shown for example by the injection hose 20 in FIG. 1, a set of the above-mentioned end inserts may be placed in each end of the mould cavity before commencing the injection. The inserts, although conforming approximately to the surfaces of the casing 11 and pipe 10, or sleeves 14, provide small gaps, orifices or discontinuities permitting air to be displaced from the interior of the mould cavity during the injection operation. Where the injection is conducted from one end of the mould cavity, as indicated by the injection hose 20a in FIG. 1, a set of the above-mentioned end inserts may be placed opposite the point of injection, and, once the mould cavity has been filled and the injection hose 20a withdrawn, a set of the end inserts may be placed within the open end of the mould cavity, and pressed into contact with the injected foam composition within the cavity, thus displacing small quantities of the foam material through the gaps between the casing 11, pipe 10, and the surfaces of the inserts as these are introduced.

Once the space or mould cavity defined between the pipe 10 and casing 11 is completely filled with the foamed cementitious composition and the injection hose 20 or the hose 20a have been removed, the injected composition is permitted to cure. It is preferred to cure the composition at elevated temperature, as this greatly reduces the overall processing time, and, further, curing at elevated temperature tends to result in products having greater strength characteristics than those obtained with comparable compositions cured at ambient temperature. Moreover, with the preferred compositions, wherein the contents of water and of cement paste binder are relatively low, there is the risk that if the composition were permitted to undergo cure over a prolonged period at ambient temperature, there would be a tendency for the cement binder paste to drain away from the aggregate, resulting in a product with undesirably reduced strengths and structural non-uniformities. During the curing operation, it is important to ensure that as far as possible, there is no loss of water or water vapour from the injected cementitious composition in order to ensure that a sufficient quantity of water remains in the material to allow the hydration reaction of the cement to be accomplished. This can be achieved by maintaining the assembly of the pipe 10, the casing 11, and injected liner composition 21 throughout the curing operation under a humidified atmosphere, preferably of at least about 95% relative humidity, more preferably at least about 97% relative humidity.

Before permitting or commencing curing, quantities of the cementitious foam remaining on the exterior of the casing 11 adjacent the central injection aperture 17 and on the outer surfaces of the pipe 10 or casing 11 adjacent their ends may be wiped away. Alternatively, any residues of the foam may be trimmed or scraped off at a subsequent stage before the composition has completely set up or cured.

In the case in which the above-mentioned end inserts are employed between the ends of the casing 11 and the adjacent surfaces of the pipe 10, any tendency for loss of moisture from the injected composition during curing may be further reduced by placing an annular end sealing cap over each exposed end of the pipe 10, with the inner sides of the end caps being brought into close engagement with the annular end face presented by the assembly of inserts and with the adjacent circular edge of the casing 11.

In the preferred form of the curing operation, as illustrated in FIG. 1, the assembly of the pipe 10, liner 21 and casing 11 is placed in a humidified oven, indicated somewhat schematically in FIG. 1 by an enclosure 41 and heating elements 42. As noted above, desirably the interior of the enclosure 41 is maintained at an elevated relative humidity of about 97%. In the curing oven, the assembly is exposed to an elevated curing temperature preferably in the range about 60° to about 95° C., more preferably about 70° to 90° C. Greatly elevated temperatures are to be avoided as the increased vapour pressure generated from the moisture within the mix may tend to disrupt the internal structure of the liner composition. In the most preferred form, the curing is conducted at a temperature of about 80° C.

In order to facilitate subsequent withdrawal of the pipe from the liner composition to expose the interior of the liner for drying purposes, it is desired to cure the liner composition without permitting the composition to bond to the exterior of the pipe 10. This can be achieved by coating the pipe 10 with a cement cure retarding and/or lubricant composition before inserting the pipe into the casing 11. The coating composition may comprise any conventional cement cure retarding agent. Suitable examples include modified salts of hydroxylated carboxylic acids. Additionally or alternatively the coating composition contains a lubricant, preferably a particulate solid lubricant such as talc, to provide a slippery surface facilitating sliding of the pipe relative to the cured liner composition as it is withdrawn from the liner. In order to ensure that the coating remains adherent to the pipe following application and during the step of injecting the liner composition, the coating composition preferably includes a thickener or binder, such as an aqueous based latex cement. The coating composition may be brushed, sprayed or wiped onto the pipe 10 to provide an even coating preferably about ten-thousandths to about one-sixteenth of an inch in thickness. In the case in which the coating composition contains no cure retarding agent, the lubricant composition prevents the liner composition from bonding to the pipe and permits the pipe to be withdrawn from the liner after this has cured. When the coating composition contains a cure retarder, the main portions of the liner composition, remote from and unaffected by the retarding agent will set up to the desired degree of cure but the portions adjacent the pipe do not set up sufficiently to bond to the pipe. The result is that in an interior annular zone of the liner adjacent the pipe, the cement paste does not set up and bond between the aggregate particles or to the pipe, leaving an annular layer of loose aggregate particles which are easily crushed or moved to one side when the pipe is subsequently withdrawn. The depth of the zone affected by the retarding agent depends on the concentration of the retarding agent present in the retarding composition. It is desired to have the insulating liner conform closely to the pipe so that the pipe is firmly supported within the liner and is not free to oscillate within the liner during handling or transportation, leading to risk of the weight of the pipe crushing the liner. Usually, the pipe is not perfectly cylindrical but will be out of round and will exhibit non uniformities in its outside diameter at points along its length. These variations and tolerances in the pipe diameter permit the pipe to lodge firmly on reintroduction into the liner after the liner has been dried. The larger the pipe the greater the variations and tolerances in diameter, and the greater the depth of the zone of the liner that may be permitted to be affected by the cure retarding agent. Thus, for example in the case of a pipe of 20 inches OD the depth of the uncured zone may be about one-quarter inch while in the case of a 2 inch OD pipe preferably this is no more than about one-sixteenth inch. The concentration of the cement cure retarding agent required in the retarding composition to produce an uncured zone of given depth in a given liner composition may of course be readily determined by trial and experiment.

Alternatively, the pipe may be mechanically debonded from the liner during the curing step. In this case, the pipe 10 is debonded from the liner composition by displacing it relative to the liner composition at a stage of partial cure of the liner composition stage at which the liner composition has achieved a degree of cure sufficient to prevent it from rebonding to the pipe 10, but before the material is sufficiently stiff that displacement of the pipe relative to the liner would produce cracks or other structural disruptions in the liner. The appropriate period of partial cure depends on the curing conditions, particularly on the curing temperature, and on the nature of the composition of the liner composition and may, of course, in any given case be determined by trial and experiment. Typically, the period of partial cure will be about 2 to about 10 hours. With the preferred compositions and curing conditions, typically the debonding operation is conducted after a partial curing period of about 2 to about 5 hours. In the preferred form, the mechanical debonding operation is conducted by rotating the pipe 10 about its axis relative to the liner composition 21, casing 11 and sleeves 14, if employed, for 2 or 3 turns. In the debonding operation, the pipe 10 rotates freely within the sleeves 14, and does not disturb the anchoring or bonding of the sleeves 14 to the liner composition 21. Normally, it will be convenient to remove the assembly from the oven or other heated and humidified enclosure 41 during the debonding operation. Following the mechanical debonding operation, the assembly, if it has been removed from the oven or other enclosure 41, is returned thereto, and the curing operation is continued, desirably under conditions of elevated temperature and humidity, and conveniently under the same conditions as those mentioned above.

Normally, it will be desirable to permit the liner composition to proceed to a fully cured hydrated condition in order to achieve a product having the maximum possible compressive strength obtainable with the particular liner composition employed. Typically, the total period of cure at elevated temperature, including any partial cure period before mechanical debonding, will extend over about 8 to about 20 hours. With the preferred compositions and curing conditions the total period of cure will be about 10 to about 15 hours in order to achieve a sufficiently cured and hydrated product. As illustrated in FIG. 1, once the liner composition has achieved a desired stage of final cure, the assembly is removed from the oven or other curing enclosure 41, and the pipe 10 is withdrawn longitudinally from the interior of the casing 11 and cured liner composition as indicated by the arrow 43 in FIG. 1, in order to expose the interior surface of the cured liner, to facilitate drying of the liner composition. As will be appreciated, the pipe 10 may be withdrawn from the casing and liner composition at any stage at which the liner composition has achieved sufficient tensile strength and coherency to render it self-supporting. Retaining the pipe 10 within the liner composition until this has finally cured limits the freedom of water to migrate from the liner composition, and thus helps retain within the liner composition a content of water sufficient for completion of the desired hydration reaction. Moreover, it is normally desirable, for convenience of working, to remove the assembly from the confines of the humidified enclosure 41 in order to withdraw the pipe 10. Withdrawal of the pipe 10 at any stage before the liner composition has reached the desired stage of cure if performed outside the confines of the humidified enclosure 41 and without waiting for the hot liner composition to cool down could result in a gross loss of moisture from the liner composition with the risk that there may then be insufficient moisture remaining in the composition to permit it to further hydrate to the desired degree of cure.

Following the removal of the pipe 10, the casing 11, together with the cured liner 21 and the bonded in place sleeves 14 is placed within a drying oven, indicated in FIG. 1 by the enclosure 44 and the heating elements 46, and is exposed to a drying atmosphere at elevated temperature, desirably above 100° C. in order to achieve drying within a satisfactorily short time, but preferably no more than about 250° C., in order to avoid risk of cracking and shrinkage of the liner composition through evolution of moisture at an unduly rapid rate. Where sealing end caps have been applied over the ends of the pipe 10 and in engagement with the end surfaces of the liner 21 and casing 11, the end caps are of course removed before commencing the drying.

Figure 5:
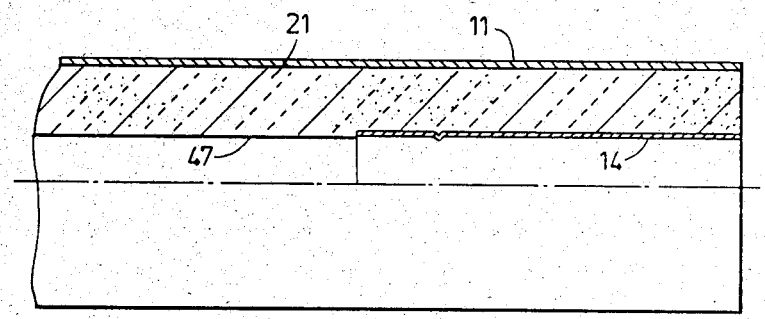
FIG. 5 is a view, partially in section, of the area circled at 5 in FIG. 1, showing the casing and liner during the drying operation.

Typically, the drying will be conducted at a temperature of about 200° C. Usually, the drying will be conducted for a period of about 20 to about 60 hours, sufficient to remove substantially all free water from the liner composition. More typically, the drying operation will be conducted for a period of about 50 hours. As illustrated in more detail in FIG. 5, during the drying operation the cylindrical interior surface 47 of the cured liner composition 21 is freely exposed to the drying atmosphere, thus readily permitting rapid drying of the cured liner to a desired degree of dryness.

Following the drying operation, the casing 11 together with the liner 21 is removed from the drying oven 44 and the pipe length 10 is reinserted within the liner, as illustrated in FIG. 1.

The above-described procedure may be modified by employing a mandrel, of the same external configuration as the pipe 10 which is ultimately to be used in the pipeline section, to form the inner wall of the mould cavity defined within the casing 11 during the step of injection of the liner composition. In such case, the mandrel, together with the sleeves 14 if employed, is positioned within the casing 11 before injecting the liner composition, and, following curing of the composition, is withdrawn from the cured liner and, after drying, is replaced by the length of pipe to be incorporated in the insulated pipeline section product. This modification is however, subject to the disadvantage that the mandrel tends to become worn by abrasion through its contact with the cured liner, and is therefore not preferred.

Figure 6:
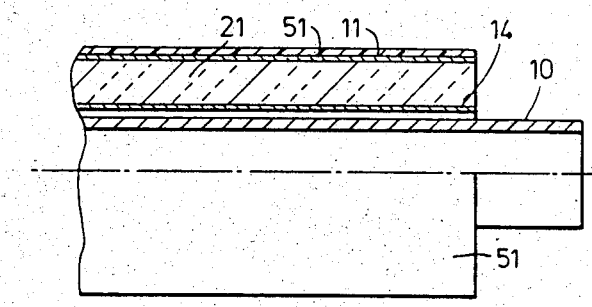
FIG. 6 is a side view, partially in section, of the area circled at 6 in FIG. 1, showing the pipeline section having a sealing and protective plastic jacket over its exterior surface.

In the case in which the casing 11 has been provided with an injection aperture 17, this may be covered with a small patch, for example of an adhesive-backed plastic material, after the liner has been dried. The entire exterior surface of the casing 11, including the exterior surface of the patch, is then coated with a protective and sealing jacket for example by passing the complete assembly through a plastic coating device, such as an extruder head 48 as shown in FIG. 1 to which a coating material e.g. molten thermoplastic is supplied along line 49, and wherein the exterior surface of the casing 11 receives a sealing and protective jacket of thermoplastic resin or other material 51, as shown in more detail in FIG. 6. The coated or jacketed product thus obtained is well adapted for use as an insulated pipeline section for use in the construction of an underground pipeline installation.

For above-ground insulated pipeline installations, where the use of thermoplastic resin or other sealing and protective coatings is not normally appropriate owing to their tendency to degrade under exposure to sunlight and weather, normally the casing 11 will be maintained as an intact, imperforate casing, with the liner composition having been injected at one end as indicated by the alternative injection arrangement indicated by the broken line 20a in FIG. 1.

The resulting insulated pipeline sections, after welding together the exposed ends of adjacent pipe lengths 10 may have the welded sections insulated by application of preformed half shell insulation sections, following which the half shell sections, after being united by strapping are covered with a sealing or protective corrosion-resistant cover e.g. a heat-shrinkable thermoplastic sleeve in the case of a below-ground installation or a preformed galvanized steel cover in the case of an above-ground installation.

In the pipeline installation, the casings 11, liners 21 and sleeves 14, where employed, of the individual pipeline sections will normally be held stationary relative to their surroundings as a result of the casings 11 being fixed to support posts in the case of above-ground installations or being anchored in the surrounding earth in the case of below-ground installations. As a result of expansion and contraction forces exerted on the pipeline, this will tend to reciprocate axially relative to the liners 21 and casings 11 during service, with the result that the externally raised weld bead normally formed at the weld between adjacent pipe lengths 10 will tend to be displaced longitudinally to a point at which it enters the liner 21 of the neighbouring pipeline section. The sleeves 14 at the end of each section of preformed insulative liner 21 offer the advantage that they preserve the insulation material liner 21 from contact with the weld bead, thus avoiding risk of the weld bead abrading, crushing, fracturing or otherwise disrupting the material of the liner 21 to the impairment of its insulative properties.

As regards the slurry compositions preferably employed in the present method, desirably, the cement employed is of the high early strength type (ASTM type III) in order to reduce the time required following injection before the foamed slurry has set up to a degree permitting a mechanical debonding operation to be carried out, and to reduce the overall time required for the fabrication of the insulated pipeline section. Desirably also, in order to reduce overall processing times, the mix will include one or more conventional cement cure accelerating agents e.g. triethanolamine which when used will be present in an amount of about up to about 2% by weight based on the total weight of the slurry mixture, more typically about 1% by weight. Desirably, the amount of cement powder employed in the mix is no more than about 30% by weight, based on the total weight of the aqueous mixture. The set up and cured cement paste is a relatively poor thermal insulator, and at contents of cement much above about 30%, the thermal insulation properties of the cured composition are undesirably low. Use of amounts of cement of less than about 10% by weight tend to result in a product which has undesirably low strength properties, and which may have insufficent compressive and other strengths to permit it to be readily handled, stored or transported. More preferably, the cement content is about 12 to about 20%, still more preferably about 15% by weight of the wet mix.

The lightweight aggregate material employed may be any expanded aggregate material having good thermal insulation properties and which is resistant to the conditions of temperature to be encountered in service and compatible with the cement material employed as the binder paste. Examples of suitable materials include expanded perlite, expanded vermiculite, and foamed glass particles. By reason of its ready availability, cheapness, and excellent thermal insulation properties, the use of expanded perlite is preferred. Desirably, the aggregate particles employed have a diameter of no more than about one-eighth inch. The use of aggregate particles of much greater than this size results in undesirably large inter-particle spacings in the mix and in the cast slurry, thus resulting in the need for the use of an undesirably large amount of the aqueous cement paste binder in order to produce a flowable slurry, and may give rise to problems in forming and maintaining a foam of the required consistency from the mix. Desirably, the aggregate is employed in a range of about 10 to about 30% by weight based on the total weight of the wet mix. The use of amount of aggregate of less than about 10% by weight tends to result in the product having undesirably low thermal insulation values, while use of amounts of aggregate much in excess of about 30% by weight tends to result in a product which has insufficient strength properties. More preferably, the aggregate is present in an amount of about 12 to about 20%, still more preferably about 15% of the wet mix. Typically, the amount of aggregate will be such as to provide in the finally cured and dried liner composition a content of about 25 to about 75%, more preferably about 30 to about 50%, and still more preferably about 40% by weight, based on the total weight of the composition.

The slurry mix will preferably contain about 50 to 80% water by weight. The use of lesser weights of water tends to result in slurries of undesirably stiff consistency which can not be readily fluidized and formed into a foam, while use of amounts of water greater than about 80% by weight may tend to result in products with undesirably low strength characteristics. More preferably the water content is about 65% to about 75% by weight of the wet mix.

Advantageously, in order to increase the flexural strength characteristics of the cast and cured composition, the wet mix contains up to about 5% by weight of fibres, more preferably about 1% by weight. The use of a quantity of fibres much greater than about 5% by weight may result in the mix having an undesirably high density, and may give rise to problems in forming the mix into a foam. Desirably, the fibres are up to about 1 inch in strand length, more typically about one-half inch length. The use of fibres of much greater strand lengths may create difficulties in handling the slurry mix and forming it into a foam. Any fibres that are compatible with the cement paste may be employed. Examples include glass fibres and synthetic resin fibres, such as polyester fibres or fibrillated polypropylene. For reasons of its low cost and excellent flexural strength imparting properties, the use of glass fibres is particularly preferred.

It is desirable to include an air-entraining agent in the mix in order to facilitate producing and maintaining the foam. Any conventional air-entraining agent may be employed and preferably the agent will be present in an amount of up to about 1% by weight, based on the total weight of the wet mix, more preferably from about 0.05 to about 0.25% by weight, and still more preferably in an amount of about 0.1% by weight. As a typical example of an air entraining agent may be mentioned the liquid surfactant material available under the trade mark CES-465 from Armak Chemicals Ltd., Saskatoon, Sask.

As noted above, desirably the foamed mix will have a wet density of about 30 to about 60 lbs per cu. ft., more preferably about 40 lbs per cu. ft.

Preferably, the finally cured and dried insulative liner composition will have a dry density of about 10 to about 30 lbs per cu. ft., more preferably about 12 to about 20 lbs per cu. ft., and still more preferably a density of about 15 lbs per cu. ft., and will have a thermal conductivity of about 0.3 to about 0.8, more typically about 0.4 to about 0.7 and more preferably about 0.5 BTU/inch/°F./hr/ft$^2$ at 400° F. mean, and a compressive strength of about 40 to about 200 psi, more preferably at least about 100 psi.

EXAMPLE

In one example, the procedure described above with reference to the drawings was followed employing a liner composition as follows:

| Ingredients | % by weight |
|---|---|
| Portland cement (ASTM Type III) | 15 |
| Expanded perlite (less than ⅛" diameter) | 15 |
| Glass fibres (¼" length) | 1 |
| Armak CES-465 (air entraining agent) | 0.1 |
| Triethanolamine | 1 |
| Water | balance |

The mix was agitated to yield a foam of wet density about 40 lbs per cu. ft. Curing was conducted at 80° C. and 97% RH for 13 hours, with mechanical debonding after 3 hours by rotation of the pipe. After withdrawal of the pipe, the assembly was dried at 200° C. for 48 hours. The cured and dried liner had a dry density of 16 lbs per cu. ft., a compressive strength of 100 psi, and an insulative value of 0.5 BTU-in/°F./hr.ft$^2$ at 400° F. mean.

What is claimed is:

1. A prefabricated thermally insulated pipeline section comprising an outer tubular casing, a pipe disposed within and in spaced relationship to the inner surfaces of the casing, and disposed between the casing and the pipe a one-piece cast thermally insulative liner comprising particles of lightweight expanded aggregate in a foamed, cured, and dried portland cement binder, the liner bonding to the inner surfaces of the casing and having an inner annular surface closely conforming to and in disjunction from the exterior surface of the pipe, so that the pipe reciprocates axially relative to the casing and liner without disrupting the material of the liner.

2. Pipeline section as claimed in claim 1 wherein the liner material has a dry density of about 10 to about 30 lbs per cu. ft.

3. Pipeline section as claimed in claim 2 wherein said density is about 12 to about 20 lbs per cu. ft.

4. Pipeline section as claimed in claim 3 wherein said density is about 15 lbs per cu. ft.

5. Pipeline section as claimed in claim 1 wherein the liner has a thermal conductivity of about 0.3 to about 0.8 BTU/in/°F./hr/ft$^2$ at 400° F. mean.

6. Pipeline section as claimed in claim 5 wherein said thermal conductivity is about 0.4 to about 0.7 BTU/in/°F./hr/ft$^2$ at 400° F. mean.

7. Pipeline section as claimed in claim 6 wherein said thermal conductivity is about 0.5 BTU/in/°F./hr/ft$^2$ at 400° F. mean.

8. Pipeline section as claimed in claim 1 wherein the liner material has a compressive strength of about 40 to about 200 psi.

9. Pipeline section as claimed in claim 8 wherein the compressive strength is about at least 100 psi.

10. Pipeline section as claimed in claim 1 wherein the liner contains about 25 to about 75% by weight of the lightweight expanded aggregate.

11. Pipeline section as claimed in claim 10 wherein the content of the aggregate is about 30 to about 50% by weight.

12. Pipeline section as claimed in claim 11 wherein said content is about 40% by weight.

13. Pipeline section as claimed in claim 1 wherein the lightweight aggregate is expanded perlite or vermiculite, or foamed glass particles.

14. Pipeline section as claimed in claim 13 wherein the aggregate is expanded perlite.

15. Pipeline section as claimed in claim 1 wherein the lightweight aggregate consists of particles of less than about one-eighth inch diameter.

16. Pipeline section as claimed in claim 1 wherein the liner material includes up to about 5% by weight fibres of up to about 1 inch length.

17. Pipeline section as claimed in claim 16 wherein the content of fibres is about 1% by weight.

18. Pipeline section as claimed in claim 16 wherein said fibres comprise glass fibres, polyester fibres or fibrillated polyolefin.

19. Pipeline section as claimed in claim 16 wherein said fibres are glass fibres.

20. A prefabricated thermally insulated pipeline section comprising an outer tubular casing, a pipe disposed within and in spaced relationship to the inner surfaces of the casing, a one piece cast thermally insulative liner disposed between the casing and the pipe and comprising particles of lightweight expanded aggregate in a foamed, cured, and dried portland cement binder, the liner bonding to the inner surfaces of the casing and having an inner annular surface closely conforming to and in disjunction from the exterior surface of the pipe, so that the pipe reciprocates relative to the casing and liner without disrupting the material of the liner, and a cylindrical sleeve bonded to the inner surface of each end of the liner and extending axially inwardly from said end of liner and circumferentially around the pipe with sufficient clearance to permit rotational and axial movement of the pipe relative to the sleeve.

21. Pipeline section as claimed in claim 20 wherein each sleeve has adjacent its inner end an annular rib extending radially inwardly from its inner surface and lightly engaging the exterior surface of the pipe.

* * * * *